United States Patent
Caggioni et al.

(10) Patent No.: US 9,337,959 B2
(45) Date of Patent: May 10, 2016

(54) DEFECT PROPAGATION OF MULTIPLE SIGNALS OF VARIOUS RATES WHEN MAPPED INTO A COMBINED SIGNAL

(71) Applicant: APPLIED MICRO CIRCUITS CORPORATION, Sunnyvale, CA (US)

(72) Inventors: Francesco Caggioni, Winchester, MA (US); Dimitrios Giannakopoulos, Andover, MA (US)

(73) Assignee: APPLIED MICRO CIRCUITS CORPORATION, Santa Clara, CA (US)

(*) Notice: Subject to any disclaimer, the term of this patent is extended or adjusted under 35 U.S.C. 154(b) by 124 days.

(21) Appl. No.: 14/053,032

(22) Filed: Oct. 14, 2013

(65) Prior Publication Data
US 2015/0106679 A1    Apr. 16, 2015

(51) Int. Cl.
*H04L 1/00* (2006.01)
*H04J 3/16* (2006.01)
(Continued)

(52) U.S. Cl.
CPC ............ *H04L 1/0076* (2013.01); *H04B 10/032* (2013.01); *H04B 10/07* (2013.01); *H04J 3/085* (2013.01); *H04J 3/14* (2013.01); *H04J 3/1611* (2013.01); *H04J 3/1652* (2013.01); *H04J 14/0227* (2013.01); *H04J 14/0279* (2013.01); *H04J 14/0294* (2013.01);
(Continued)

(58) Field of Classification Search
CPC ... H04L 1/0076; H04L 12/413; H04L 12/437; H04L 2012/5627; H04L 41/06; H04L 41/0677; H04L 41/26; H04L 45/245; H04L 49/552; H04L 49/555; H04J 2203/006; H04J 3/1652; H04J 14/0227; H04J 14/0279; H04J 14/0287; H04J 14/0294; H04J 14/0297; H04J 3/085; H04J 3/14; H04J 3/1611; H04B 10/032; H04B 10/07; H04B 10/0775; H04B 10/0791; H04B 10/0793; H04B 10/1123; H04B 10/27; H04Q 2011/0081; H04Q 2213/1301; H04Q 2213/13166; H04Q 3/54591
USPC .......... 714/776, 704, 712, 742; 370/242, 241, 370/248, 536, 537, 538, 539, 907; 398/1, 398/10, 16, 17, 22–24, 27, 58; 709/203
See application file for complete search history.

(56) References Cited

U.S. PATENT DOCUMENTS 6,081,503 A * 6/2000 Bordogna et al. ............ 370/222
7,447,639 B2 * 11/2008 Wang .................... G10H 1/0058
704/230

(Continued)

OTHER PUBLICATIONS

IEEE Standard for Ethernet, IEEE Std 802.3-2012, LAN/MAN Standards Committee of the IEEE Computer Society.

*Primary Examiner* — John J Tabone, Jr.
(74) *Attorney, Agent, or Firm* — Amin, Turocy & Watson LLP; Gregory Turocy

(57) ABSTRACT

Systems and methods for detecting defect propagation in a networked environment comprising a defect detection component to detect defects in an aggregate signal and/or in individual signals; and a replacement signal component to generate a maintenance signal to replace defective signals detected by the defect detection component. The maintenance signal can be a uniform signal type regardless of a type associated with a defective signal. The maintenance signal can replace a defective signal during aggregation, by an aggregation component. In another aspect, the maintenance signal can replace the defective signal during de-aggregation

24 Claims, 11 Drawing Sheets

(51) Int. Cl.
  *H04J 14/02* (2006.01)
  *H04J 3/08* (2006.01)
  *H04L 12/24* (2006.01)
  *H04J 3/14* (2006.01)
  *H04B 10/032* (2013.01)
  *H04B 10/07* (2013.01)

(52) U.S. Cl.
  CPC ............ *H04J 14/0297* (2013.01); *H04L 41/06* (2013.01); *H04L 41/0677* (2013.01); *H04L 1/0045* (2013.01); *H04L 2001/0097* (2013.01)

(56) References Cited

U.S. PATENT DOCUMENTS

| | | | |
|---|---|---|---|
| 7,948,862 B2 | 5/2011 | Parnaby | |
| 8,144,635 B1 | 3/2012 | Lo | |
| 8,249,454 B2 | 8/2012 | Sugawara et al. | |
| 8,294,606 B2 | 10/2012 | Zimmerman et al. | |
| 8,307,265 B2 | 11/2012 | Ganga et al. | |
| 8,370,704 B2 | 2/2013 | Ganga et al. | |
| 8,675,498 B2 * | 3/2014 | Jonnala | 370/242 |
| 8,693,468 B2 * | 4/2014 | Warke et al. | 370/359 |
| 8,761,209 B1 * | 6/2014 | Brown et al. | 370/540 |
| 2002/0126334 A1 * | 9/2002 | Milton | H04J 14/0206 398/9 |
| 2003/0011836 A1 * | 1/2003 | Das | H04B 10/0775 398/5 |
| 2003/0112821 A1 * | 6/2003 | Cleveland | H04L 1/0002 370/468 |
| 2004/0008988 A1 * | 1/2004 | Gerstal et al. | 398/45 |
| 2004/0264454 A1 * | 12/2004 | Rajkumar et al. | 370/389 |
| 2006/0039416 A1 * | 2/2006 | Yadav et al. | 370/537 |
| 2006/0098660 A1 * | 5/2006 | Pal et al. | 370/395.51 |
| 2007/0133564 A1 * | 6/2007 | Chun et al. | 370/395.51 |
| 2008/0016402 A1 * | 1/2008 | Harel et al. | 714/43 |
| 2009/0187631 A1 * | 7/2009 | Su et al. | 709/206 |
| 2011/0058807 A1 * | 3/2011 | Suzuki | H04L 12/40045 398/23 |
| 2011/0097077 A1 * | 4/2011 | Suzuki | H04B 10/0791 398/5 |
| 2012/0044927 A1 * | 2/2012 | Pan et al. | 370/345 |
| 2013/0058330 A1 * | 3/2013 | Warke et al. | 370/359 |
| 2013/0129341 A1 * | 5/2013 | D'Errico et al. | 398/5 |
| 2013/0322867 A1 * | 12/2013 | Ibach et al. | 398/2 |
| 2014/0169783 A1 * | 6/2014 | Surek | 398/10 |
| 2015/0070364 A1 * | 3/2015 | Anantharaman et al. | 345/505 |
| 2015/0071311 A1 * | 3/2015 | Caggioni et al. | 370/540 |
| 2015/0078406 A1 * | 3/2015 | Caggioni et al. | 370/537 |

* cited by examiner

DEFECT PROPAGATION OF MULTIPLE SIGNALS OF VARIOUS RATES WHEN MAPPED INTO A COMBINED SIGNAL

TECHNICAL FIELD

The subject disclosure relates generally to networking, and more particularly to defect propagation through a combined signal.

BACKGROUND

Electronic communications, whether over a local or wide-area network or among components of a local bus, can involve a variety of programmed actions and/or protocols. For instance, data to be transmitted throughout a network (e.g., from one electronic component to another) is often organized into subgroups of transmitted information. A networking protocol can specify formats and/or rules for the transmission and/or reception of data (e.g., data signals) within a network (e.g., an Ethernet network). For example, a networking protocol can provide various formats and/or rules for routing data signals in a network (e.g., routing data signals between hubs, switches and/or routers).

Often times, numerous devices in a network are configured to retime, multiplex and/or de-multiplex data signals (e.g., incoming network traffic). For example, a network component can receive one or more 10 gigabit per second (Gbps) Ethernet signals and can output four 25 Gbps Ethernet signals to allow more efficient transport of the data signal throughout the network. However, often times a network includes a variety of signal types (e.g., a variety of network protocols) and/or a variety of signal data rates. However, current network systems do not adequately process and/or transmit network signals associated with various signals types and/or various data rates. Therefore, functionality and/or efficiency of current network systems can be improved.

The above-described description is merely intended to provide a contextual overview of current network systems and is not intended to be exhaustive.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

In an example embodiment, a system comprises a defect detection component coupled with a replacement signal component. The defect detection component is configured for detecting a defective signal. The defective signal can represent a signal to be aggregated and/or a signal of an aggregated signal. The replacement signal component can replace a defective signal with an appropriate replacement signal to maintain and/or enable integrity among signals.

In another example embodiment, a method comprises receiving, by a system comprising a processor, a plurality of signals. The method detects a defect in one or more signals of the plurality of signals and generates an appropriate replacement signal. The method also comprises reformatting, by the system, respective signal formats of the plurality of signals to generate a plurality of modified signals. Additionally, the method comprises combining, by the system, the plurality of modified signals and the replacement signal to generate a combined signal.

In yet another example embodiment, a system provides means for defect propagation through multiple signals of various data rates. The system can primarily include means for receiving signal(s) (which are of various data rates); means for reformatting the signal(s) (such as scaling data rates); means for detecting defective signal(s) that have an identifiable defect; and means for replacing the defective signal(s) with an appropriate replacement signal(s). Additionally, the system comprises a means for combining the signal(s) and the replacement signal(s) to generate a combined signal and/or means for de-aggregating a combined signal, based in part on the replacement signal(s).

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

DETAILED DESCRIPTION

Figure 1:
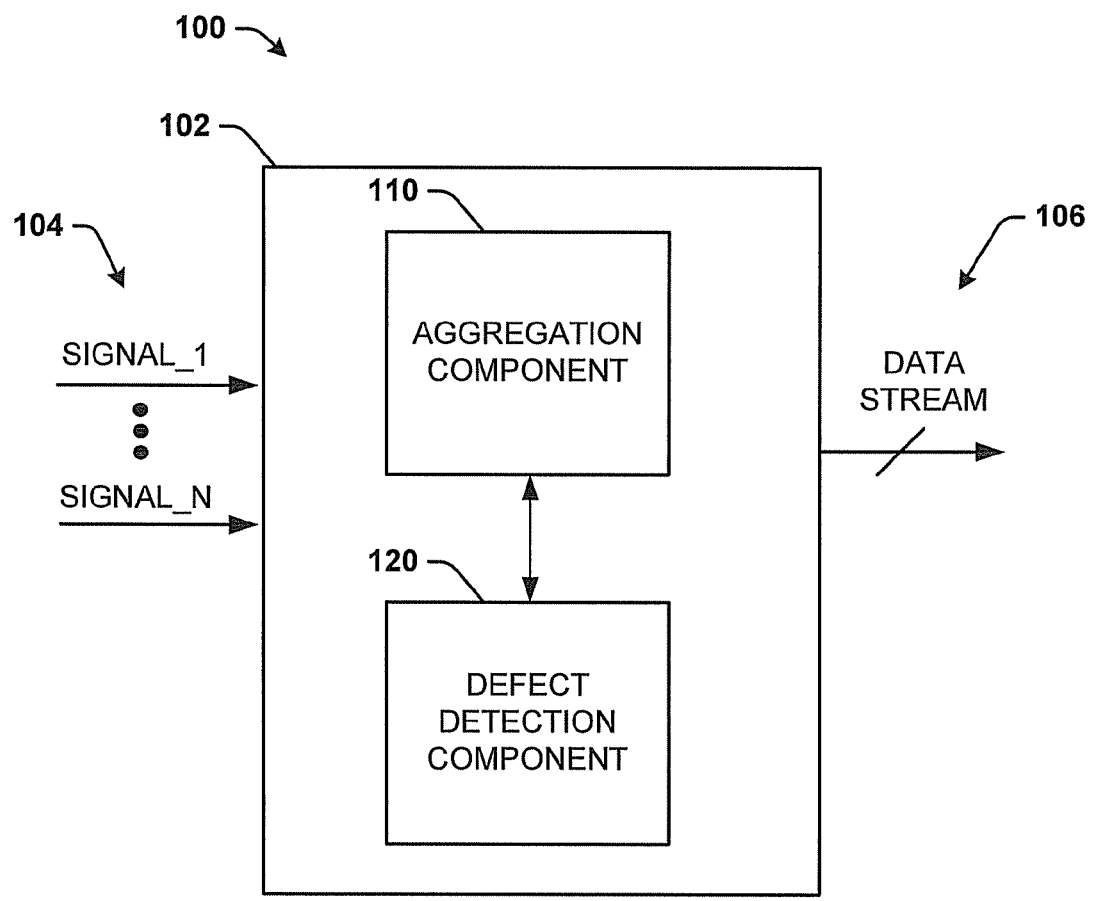
FIG. 1 is a block diagram illustrating an example, non-limiting embodiment of a system for propagating a defect associated with a maintenance signal in accordance with various aspects described herein.

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

Various aspects of the present disclosure provide a system for defect propagation of signals, of various formats, associated with an aggregated signal. In an aspect, the system receives signals of various formats and can detect a defect in one or more of the signals. The system can reformat and/or combine the signals to generate the aggregated signal.

It is noted that signals, unless context suggests otherwise, can include one or more bits (e.g., boundary identification bits, one or more header bits and/or one or more bits (e.g., 64 bits) containing information client) associated with client devices, one or more channels (e.g., data stream channels), a network processing unit (NPU), a media access control (MAC), and/or signals associated with one or more physical lanes (e.g., one or more physical connections). Signals can be implemented as a plurality of OTN signals (e.g., OTU2 signals, OTU2e signals, OTU1e, OTU3, OU3e2, etc.), a plurality of Ethernet signals, a plurality of Fibre Channel (FC) signals, a plurality of synchronous optical networking signals (SONET/SDH), physical coding sub-layer (PCS) lanes, and/or a plurality of other signals. In an example, signals can be encoded/decoded signals, a serial stream of formatted blocks (e.g., a 64B/66B encoded signal).

As such, signals that comprise different formats (e.g., data rates) and a defective signal(s) can be transmitted (e.g., over a serial interface and/or a parallel interface associated with the same data rate) via a combined signal, that includes a replacement signal, which has a single format (e.g., data rate).

For example, a system can receive signals of various data rates (e.g., 10 gigabits per second (G), 40G, 100G, etc.), which can be sent for various devices through various networks (e.g., optical transport network (OTN), Ethernet, Fibre Channel (FC), synchronous optical networking (SONET/SDH), other signal types, etc.). The system can detect a defect in one or more of the signals and replace the one or more signals having a defect with an appropriate signal. The system can aggregate the one or more replacement signals and the signals of various data rates into an aggregated signal having a defined data rate. The aggregated signal can propagate, via a carrier, to a destination. The aggregated signal can be separated into signals, associated with the original signals, having various data rates. Accordingly, network efficiency and/or reliability can be increased.

It is noted that references to various data rates and/or signal types are described herein. However, data rates (e.g., 10G, 40G, 100G, etc.) can be of any appropriate rate that does not exceed a payload capacity associated with a network. Further, signals can be of any appropriate type.

Turning now to FIG. 1, depicted is a functional block diagram illustrating an exemplary non-limiting embodiment of a system 100 in accordance with various aspects described herein is shown. System 100 includes a defect propagation component 102 that can propagate a replacement signal, associated with a defective signal, in an aggregated signal. Defect propagation component 102 can primarily include an aggregation component 110 (which can aggregate signals having one or more types) and a defect detection component 120 (which can detect a defect in a signal). In embodiments, the system 100 can be implemented in a data communication system and/or a telecommunication system. For example, the system 100 can be implemented in, but not limited to, an Ethernet network system, an OTN system, a FC system, and the like. It is noted that the system 100 can be associated with more than one type of data communication system and/or telecommunication system. In another aspect, defect propagation component 102 can be comprised in larger devices, such as servers, base stations, a system interface, a client interface, a host interface a line interface, printed circuit board (PCB), application-specific integrated circuit (ASIC), computer, and the like.

Defect propagation component 102 can receive N signals 104 (e.g., signal_1-signal_N), where N is a number. The signals 104 can comprise signals of various data rates and/or generate data rates (e.g., serial data rates) of 10G, 40G and/or 100G (e.g., with virtual lane interleaving nodes). It is noted that signals 104 can be of different types, such as wireless, wired, and the like. For example, signals 104 can include 10G signals, 40G signals, and/or 100G signals. However, it is to be appreciated that the plurality of signals can include different data rates (e.g., 8G, 20G, 50G, 100G, etc.). It is noted that, a data rate can be a data rate within a certain range of values (e.g., a range of values above and/or below 10G) and/or a maximum data rate (e.g., signal capable of 10G).

In an aspect, defect detection component 120 can detect a defective signal of the signals 104 and/or a defect in the signals 104. A defect can represent an error in a signal, a lost signal, an unpopulated signal, a marker indicating a defect and/or unpopulated signal, a clock range anomaly, and/or the like. For example, a signal can be discontinued at a source that generates the signal, disconnected during propagation (e.g., a carrier line can be broken), degraded, and/or otherwise corrupted. It is noted that a defect can be a random bit error, erasure error, or the like. A random bit error can be caused by the imperfection of physical channels, which results in inversion, insertion or deletion of an information bit. Erasure errors, on the other hand, include such information loss as cell loss in packet switched networks (e.g., Asynchronous Transfer Mode, or ATM, networks) and burst error.

In embodiments, the defect detection component 120 can replace a signal associated with a defect, with a replacement signal. The replacement signal can be a common maintenance signal. The defect detection component 120 can determine a format for the maintenance signal. In an aspect, a format can include a frequency, a property of a signal, and/or the like. In an aspect, the maintenance signal can be a pseudo random noise signal, such as pseudo noise 11 (PN-11), generic alarm indication signal (AIS), and/or other signal providing enough density or transmissions. For example, PN-11 is generated by a polynomial $1+x^9+x^{11}$. A pseudo random noise signal can consist of a deterministic sequence of pulses that will repeat itself after a period. It is noted that other types of signals can optionally be utilized such that a resulting combined signal generated by the aggregation component 102 can be reliably recovered by a receiver.

In embodiments, the defect detection component 120 can determine a client device type associated with a defective signal. The client device type can be associated with a determined frequency that is within a range specified for the device type. In an example, an OTU2 client can have an associated rate of 10.709 Gb/s+/−20 ppm, while for an 10GbE client, an associated rate can be 10.3125 Gb/s+/−100 ppm. In another aspect, the defect detection component 120 can generate a maintenance signal at a rate associated with the client device type. In another aspect, when a client is unequipped (e.g., disabled by a network operator) the defect detection component 120 can generate the maintenance signal (e.g., PN-11) as a replacement signal such that a defined bit stream is propagated through a network in place of an uncontrolled signal.

The aggregation component 110 can reformat signals 104. For example, the aggregation component 120 can convert signals 104 into modified signals of a different rate than the plurality of first signals. In one non-limiting example, the aggregation component 120 can convert 10G signals into modified 10G signals. In an example, the aggregation component 120 can convert a set of K signals into a first set of modified signals of a first type and a set of J signals of a second type into a second set of modified signals, etc. In another aspect, aggregation component 120 can convert a signal of the signals 104 into tributary signals of a smaller rate. As an example, the aggregation component 120 can convert a 40G signal into four 10G tributary signals (e.g., four 10G sub-signals). As such, each of the four 10G tributary signals (e.g., each of the four 10G sub-signals) can be converted into a modified signal. In one non-limiting example, the aggregation component can convert two 10G signals into two modified 10G signals and two 40G signals into eight modified 40G signals. In another aspect, defect detection component 120 can replace one or more tributary signals with one or more maintenance signals, and/or replace associated tributary signals with one or more maintenance signals. It is noted that defect detection component 120 can determine the defect in one tributary signal and replace associated tributary signals without and/or before detecting a defect in the associated tributary signals. For example, a 40G signal can be divided into four 10G tributary signals. Defect detection component 120 can detect a defect in one of the four tributary signals and, in response, the aggregation component 110 can replace all four 10G tributary signals with a maintenance signal and/or with four maintenance signals It is noted that in other embodiments, the detection component 120 can replace the defective tributary signal without replacing associated tributary signals that do not have a defect.

In embodiments, the aggregation component 120 can combine (e.g., aggregate) the signals 104 (and/or combine modified signals associated with the signals 104) and the maintenance signal into an aggregated signal of data stream 106. The maintenance signal can be mapped according to the mapping scheme of the aggregation component 110 and may not require special treatment. In an aspect, the aggregate signal can comprise a higher data rate than respective data rates associated with the signals 104. The combined signal can include a plurality of virtual lanes. As such, the aggregation component 110 can reformat the signals 104 into virtual lanes of the combined signal. In an aspect, the aggregation component 110 can de-multiplex signals 104 into virtual lanes to generate virtual lanes of the aggregate signal. The virtual lanes of the combined signal can be synchronous to a common clock domain. In one example, virtual lanes can be implemented as multi-link gearbox (MLG) lanes. In another aspect, the aggregate signal can be generated according to a MLG protocol. In an example, the plurality of virtual lanes can be pseudo-100G virtual lanes of data stream 106.

In another aspect, defect propagation component 102 can transmit data stream 106 (which can comprise an aggregate signal). Defect propagation component 102 can, for example, be configured to bit interleave virtual lanes of an aggregate signal for the bit stream 106. It is noted that data stream 106 can comprise physical lanes, PCS lanes, and/or the like.

It is noted that defect propagation component 102 can, for example, include a transmitter (not shown). The transmitter can be implemented as an inter-device connection compatible with CAUI-4, a multi-lane (e.g., 4-lane) 100GBASE-R protocol device. For example, CAUI-4 can be a physical instantiation of a signal in a plurality of physical lanes (e.g., a 100G signal in four physical lanes) across a physical medium (e.g., a copper medium) for interconnect between a first device and a second device (e.g., between a MAC device and a PHY device, between a pair of PHY devices, etc). As such, CAUI-4 can be a four-lane instantiation of a signaling protocol defined for transmission of an aggregate data stream (e.g., a 100G data stream) across various media (e.g., 100GBASE-R). It is to be appreciated that CAUI-4 can be associated with other types of interfaces (e.g., CPPI-4, OIF-28G-VSR, etc.). As such, the one or more data streams can be an aggregate data stream (e.g., an aggregate 1000 data stream) that comprises one or more physical lanes (e.g., a 100G physical lane, two 500 physical lanes, four 25G physical lanes, five 20G physical lanes, ten 10G physical lanes, etc.).

Figure 2:
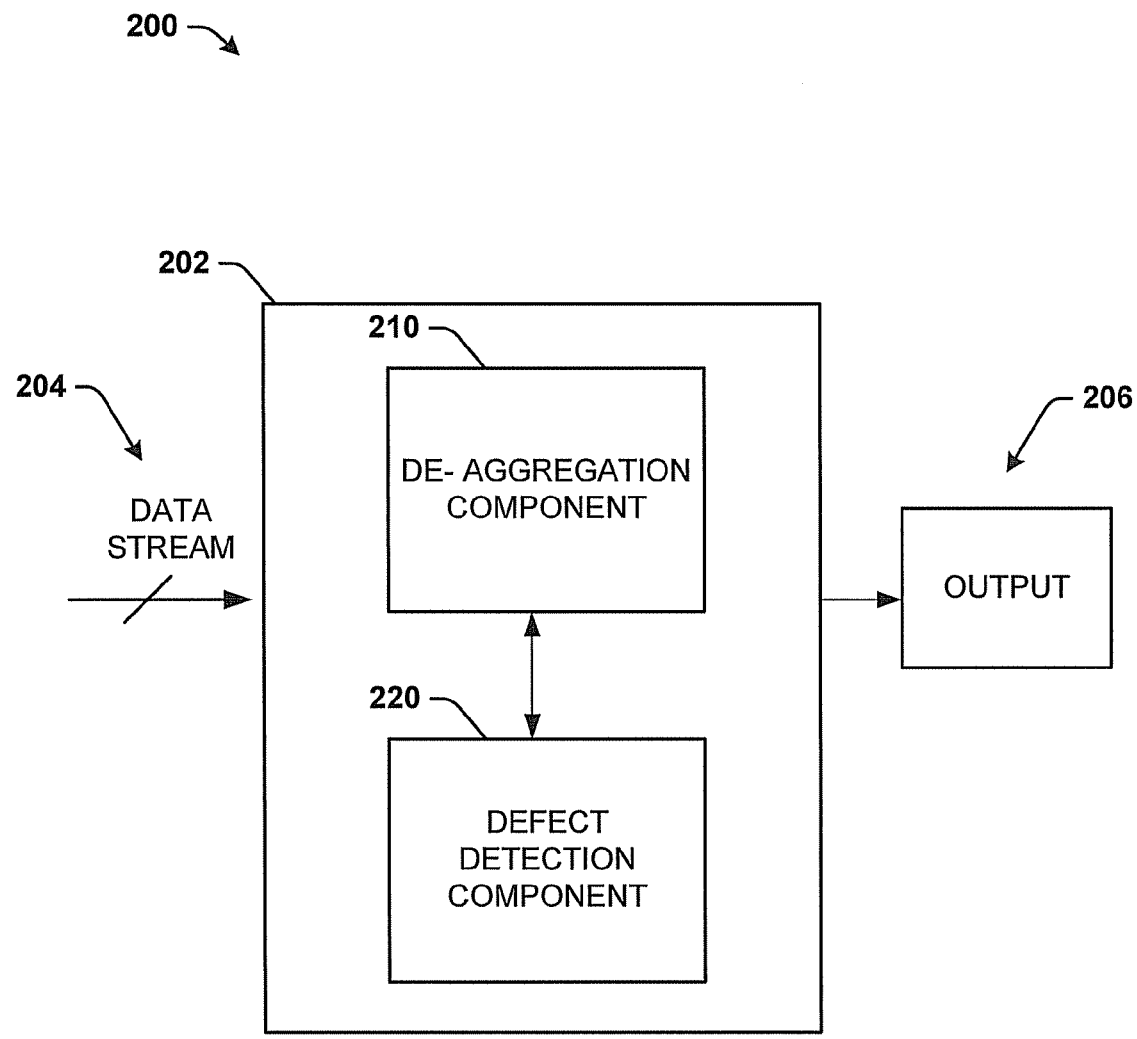
FIG. 2 is a block diagram illustrating an example, non-limiting embodiment of a system for propagating a defect associated with a maintenance signal including de-aggregating an aggregate signal in accordance with various aspects described herein.

Referring now to FIG. 2, depicted is a functional block diagram illustrating an exemplary non-limiting embodiment of a system 200 which can facilitate defect propagation, in accordance with various aspects described herein is shown. System 200 includes a defect propagation component 202 that can detect defects in data stream 204. Defect propagation component 202 can primarily include a de-aggregation component 210 (which can de-aggregate signals having one or more types) and a defect detection component 220 (which can detect a defect in a signal).

Defect propagation component 202 can receive a data stream 204. In an aspect, the data stream 204 can comprise an aggregate signal. For example, data stream 204 can comprise aspects of data stream 106.

In another aspect, de-aggregation component 210 can de-aggregate the data stream 204. For example, the de-aggregation component 210 can de-aggregate a pseudo signal into one or more signals associated with client signals (e.g., associated with signals 104 of FIG. 1). In an aspect, de-aggregation component 210 can de-code, de-multiplex, de-map, and/or otherwise reformat an aggregate signal (and/or virtual lanes, etc,) of data stream 204 to generate the one or more signals. In another aspect, the de-aggregation component 210 can be configured to re-format the plurality of virtual lanes of the pseudo signal. In another aspect, the defect propagation component 202 can de-map signals of data stream 204 and/or recover clock settings associated with the signals. It is noted that a maintenance signal can be de-mapped and/or a clock associated with the maintenance signal can be recovered according to the methodology utilized to de-map/recover a clock of a non-maintenance signal.

Defect detection component 220 can detect a defect in data stream 204 and/or a de-aggregated signal associated with data stream 204. It is noted that, defect detection component 220 can detect a defect according to various aspects disclosed herein. In embodiments, defect detection component 220 can detect a maintenance signal which represents a defective signal associated with a client signal. For example, defect detection component 220 can detect a pseudo noise signal (e.g., PN-11) and the like.

In embodiments defect propagation component 202 can generate output 206 associated with de-aggregated signals of a data stream 204. The output 206 can comprise various signals associated with client signals and can comprise maintenance signals. In another aspect, the output 206 can comprise various signals of various types and/or formats (e.g., 10G, 40G, etc.). It is noted that defect propagation component 202 can suppress maintenance signals and/or generate signals indicative of a defect for a determined client type. For example, defect propagation component 202 can identify a maintenance signal (e.g., via defect detection component 220) and can replace the maintenance signal with an error signal associated with a specific device.

Figure 3:
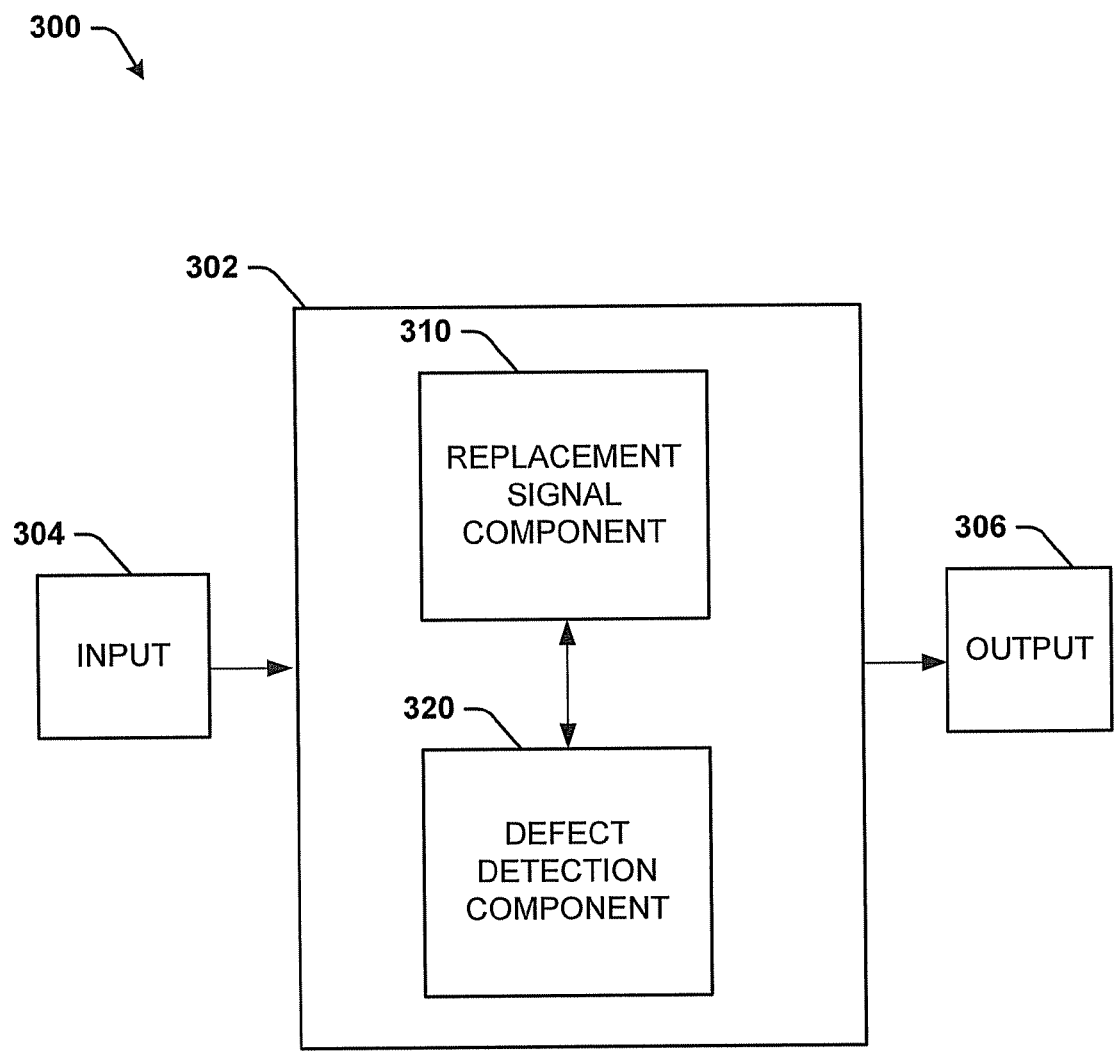
FIG. 3 is a block diagram illustrating an example, non-limiting embodiment of a system for propagating a defect associated with a maintenance signal including replacing a defective signal in accordance with various aspects described herein.

Referring now to FIG. 3, depicted is a functional block diagram illustrating an exemplary non-limiting embodiment of a system 300 which can facilitate defect propagation, in accordance with various aspects described herein is shown. System 300 includes a defect propagation component 302 that can detect defects in input 304 and generate output 306 to facilitate reliability in a network. System 300 can include a defect propagation component 302 (which replaces defective signals with a maintenance signal) and can primarily include a replacement signal component 310 (which can generate an appropriate replacement signal) and a defect detection component 320 (which can detect a defect in input 304). In embodiments, defect propagation component 302 can be comprised in larger systems, such as error detection devices, network nodes, and the like.

The defect detection component 302 can detect a defect in input 304. For example, defect detection component 302 can receive an aggregate signal and/or a plurality of signals. The defect detection component 302 can detect the defect based on an abnormality in the input 304 (e.g., clock abnormality associated with an uncontrolled signal, etc.). It is noted that defect detection component 302 can detect a defect in a tributary signal associated with the input and can replace the tributary signal, and other associated tributary signals with one or more maintenance signals. For example, a client device can transmit a 40G signal. An aggregation component (e.g., aggregation component 110) can generate tributary signals associated with the 40G signal (e.g., four 10G signals, etc.) During transmission the client device can become disconnected and the tributary signals can become uncontrolled. The defect detection component 320 can detect a defect in one or more of the tributary signals. Replacement signal component 310 can generate a replacement signal (e.g., maintenance signal) for each of the one or more tributary signals and associated tributary signals. In another aspect replacement signal component 310 can integrate the replacement signal with other signals of input 304 and can generate a resulting signal and/or aggregate signal as output 306.

In embodiments, replacement signal component 310 can generate a replacement signal for a detected defect associated with one or more signals (e.g., as detected by the defect detection component 320). In an aspect, replacement signal component 310 can determine a type associated with a defective signal and can generate an appropriate signal to replace the defective signal. For example, replacement signal component 310 can determine a frequency and/or frequency range associated with a defective signal and can generate an appropriate replacement signal based on the frequency and/or frequency range. In another aspect, replacement signal component 310 can replace defective signals with pseudo noise signals (e.g., PN-11) or another appropriate signal. It is noted that a replacement signal can be determined based on a metric associated with a signal (e.g., density, transitions, etc.), known signal formats, and/or recognizable signal formats.

As an example, defect propagation component 302 can be comprised in a network node and/or signal testing device. A network node can be deployed in a network to receive and/or re-transmit a signal. During transmissions a signal can become defect and/or degraded through various events (e.g., disconnected client, error in a carrier (e.g., broken wireline), and the like). Defect propagation component 302 can detect the defect and replace a defective signal(s) with maintenance signal(s) to maintain integrity of the network. It is noted that defect propagation component 302 can perform encoding, aggregations, de-coding, and/or de-aggregation to facilitate defect detection (via defect detection component 320) and/or signal replacement (via replacement signal component 310). It is further noted that, defection propagation component 302 can replace various types of signals, such as a signal in a virtual lane, a mapped signal, a reformatted and/or partially reformat signal, a signal having a client device format, and the like.

As another example, defect propagation component 302 can be comprised in a network maintenance device. A network maintenance device can be utilized by a field technician to determine location of an error in a network. The field technician can selectively place the network maintenance device at various locations of a network to determine a location of an error. In an aspect, defect propagation component 302 can detect defective signals and replace the signals with a maintenance signal.

Figure 4:
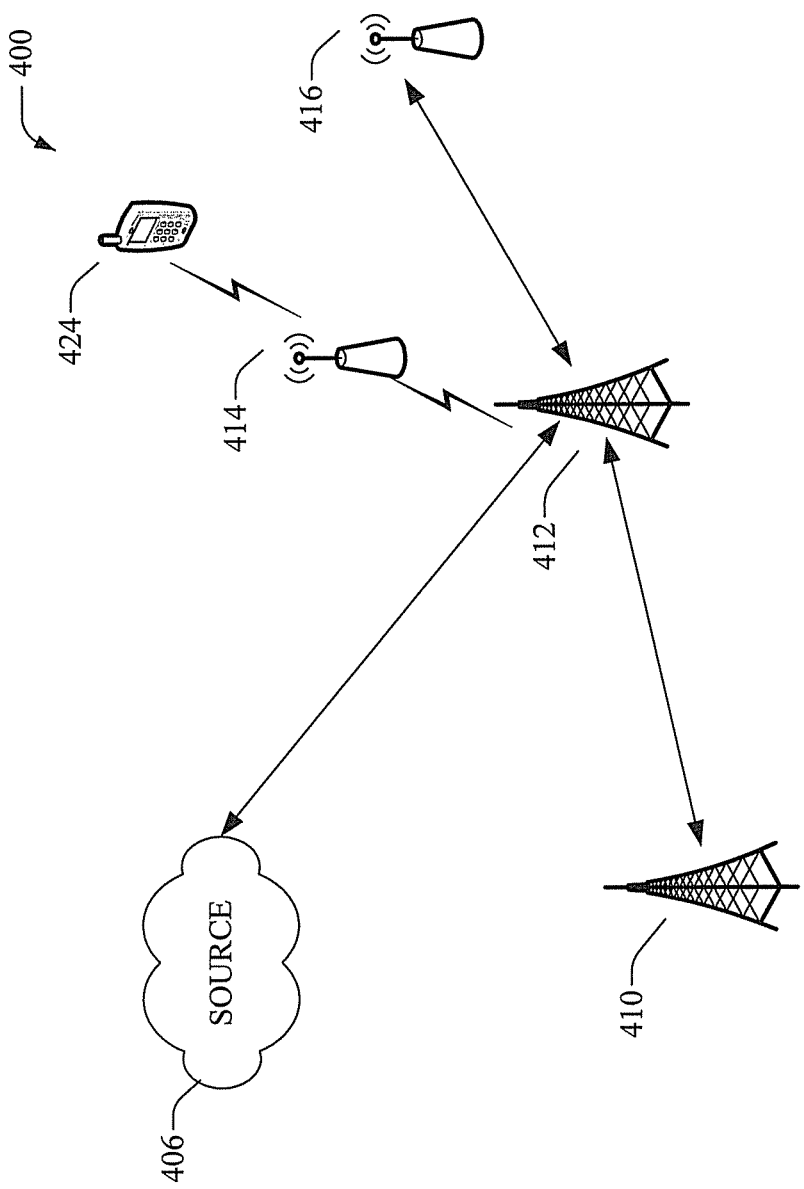
FIG. 4 is a functional illustration of an example, non-limiting embodiment of a system for propagating a defect in a network in accordance with various aspects described herein.

Referring now to FIG. 4, there illustrated is an exemplary non-limiting environmental diagram of a system 400 that facilitates defect propagation. System 400 can represent a network capable of communicating signals through various methodologies. In an aspect, system 400 can comprise a source 406 (which generates client signals), one or more macro nodes 410 and 412 (which can connect various network components), one or more access points 414 and 416 (which connect various network components but have a relatively smaller coverage area than macro nodes 410 and 412) and a client device 424 (which can send and/or receive a signal). It is noted that system 400 can comprise various other components.

The source 406 can represent a source of transmissions. Source 406 can send and/or receive transmissions associated with client devices. In an example, source 406 sends a signal to macro node 412. The signal can comprise one or more aggregate signals and/or can represent multiple signals to be aggregated. Macro node 412 can transmit the signal to macro node 410, access points 414 and 416. While access point 414 can transmit a signal in a client format to the client device 424.

It is noted that, with reference to FIGS. 1-3, the defect propagation components (102, 202, and 302) can be comprised in one or more of source 406, macro nodes 410 and 412, and/or access points 414 and 416. For example, source 406 can aggregated a plurality of signals associated with client devices. The source 406 can detect defective signals and replace the defective signals with one or more maintenance signals. In an aspect, replacing defective signals can increase durability and/or reliability of system 400.

Continuing with the above example, macro nodes 410 and 412, and/or access points 414 and 416 can detect defects in a signal and replace the signal with a maintenance signal. Accordingly, defects can be replaced at various locations of system 400.

In embodiments, the various components of system 400 can de-aggregate an aggregate signal and detect a defect. In an aspect, the defect can be detected by detecting a maintenance signal. For example, access point 414 can detect a maintenance signal associated with client device 424. Access point 414 can replace the maintenance signal with a specialized maintenance signal based on a determined type associated with client device 424.

Figure 5:
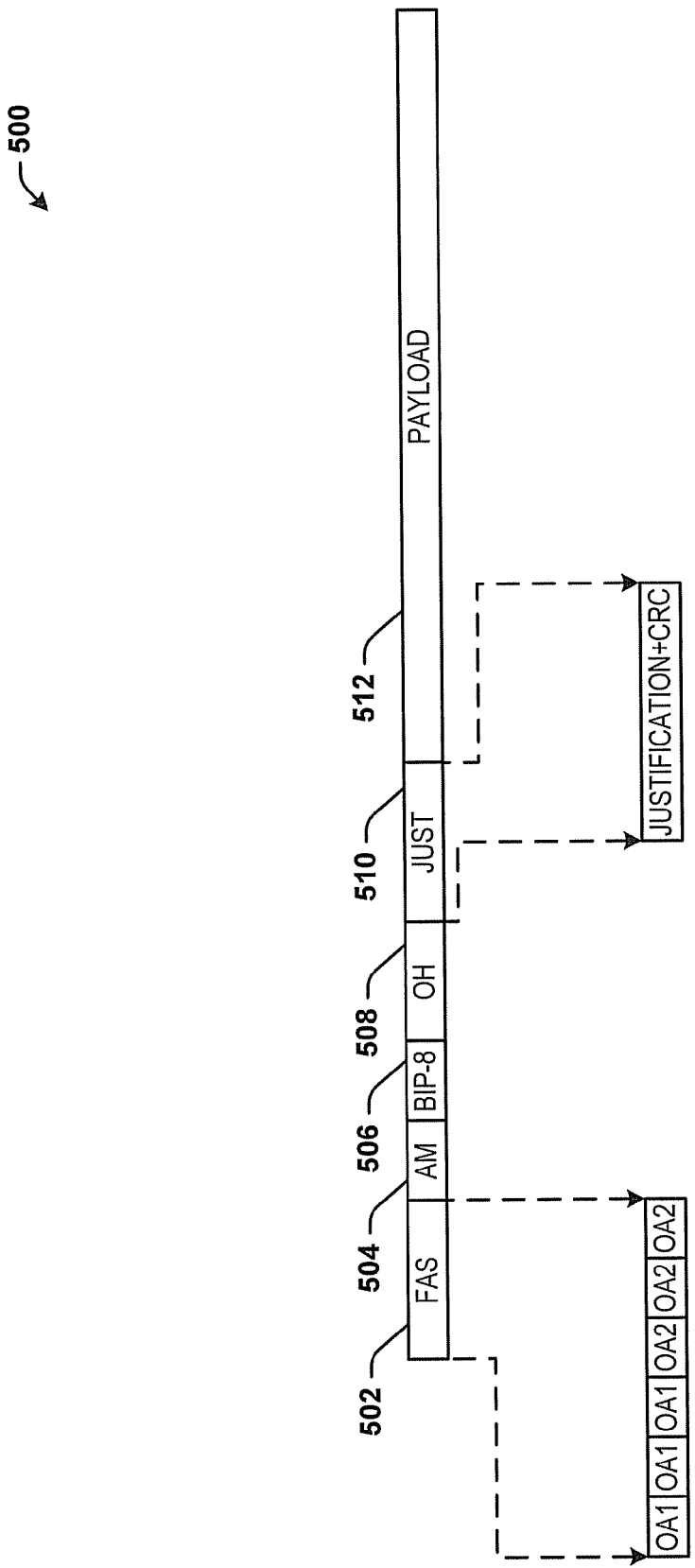
FIG. 5 is a block diagram illustrating an example, non-limiting embodiment of a system for transmitting a maintenance signal associated with a defective signal in accordance with various aspects described herein.

Referring now to FIG. 5, an example, non-limiting embodiment of a modified signal, in accordance with various aspects described herein is shown. For example, aggregation component 110 can modify signals 104 into modified signal 500. Modified signal 500 can be partitioned into a plurality of data fields. For example, a modified signal 500 can include a frame alignment signal (FAS) field 502, an alignment marker (AM) field 504, a bit interleaved parity 8 (BIP-8) field 506, an overhead (OH) field 508, a justification (JUST) field 510 and/or a payload field (e.g., payload data field, payload area, etc.) 512.

The FAS field 502 can comprise one or more bytes (e.g., 6 bytes). The FAS field 502 can indicate a start of a frame (e.g., a first partition of a frame for a modified signal). The FAS field 502 can be repeated periodically (e.g., after a last partition of a frame for a modified signal is generated). For example, the FAS field 502 can be repeated after a payload field is generated. The FAS field 502 can include a pattern of data. For example, the FAS field 502 can include a first byte of data (e.g., OA1) that is repeated one or more times and a second byte of data (e.g., OA2) that is repeated one or more times (e.g., a OA1-OA1-OA1-OA2-OA2-OA2 pattern). In one example, the first byte of data can be represented as "1111 0110" and the second byte of data can be represented as "0010 1000". However, it is to be appreciated that a different number of byte values and/or different byte values can be utilized.

The FAS field 502 can be followed by the alignment marker (AM) field 504. The AM field 804 can be implemented for lane identification and/or de-skewing purposes. In one example, the AM field 504 can be a 1-byte data field. A value of the AM field 804 can be incremented every frame. In an aspect, a value of the AM field 804 can be generated by and/or associated with a roll-over counter. In one example, a value (e.g., a modulo operation on the value) included in the AM field 804 can specify a virtual lane identification (ID). For example, a virtual lane ID can be specified for each of the plurality of virtual lanes of the combined signal. In an aspect, a value of "0" (e.g., which can result from the modulo operation on the value included in the AM field 504) can represent a first virtual lane (e.g., virtual lane 0) of a modified signal and a value of "1" (e.g., which can result from the modulo operation on the value included in the AM field 504) can represent a second virtual lane (e.g., virtual lane 1) of a modified signal. The value (e.g., the actual value) of the AM field 504 can be utilized by the de-aggregation component 210 for de-skewing the plurality of virtual lanes included in the combined signal.

The BIP-8 field 506 can be utilized for monitoring purposes. In one example, a value for the BIP-8 field 506 can be computed as a function of bits associated with the AM field 504, the OH field 508, the JUST field 510, and/or the payload field 512. As such, a value for the BIP-8 field 506 can be generated as a function of the AM field 504, the OH field 508, the JUST field 510, and/or the payload field 512 (e.g., a value for the BIP-8 field 506 can be generated without data included in the FAS field 502). In an aspect, the BIP-8 field 506 can be a third partition of a frame. In one example, the BIP-8 field 506 can be associated with even parity error checking. In another example, the BIP-8 506 field can be associated with odd parity error checking.

In embodiments, modified signal 500 can represent a defective signal. In this case, modified signal 500 can carry a maintenance signal (e.g., PN-11). In an aspect, the BIP-8 field 506 can remain the same for maintenance signals and a non-maintenance signal.

The OH field 508 can be implemented for overhead purposes. A value of the OH field 508 can be all zeros when the OH field 508 is not utilized (e.g., prior to scrambling). In one example, the OH field 508 can be two bytes. However, it is to be appreciated that the OH field 508 can be a different size.

The JUST field 510 can include one or more bytes associated with justification information (e.g., for rate adaptation of the plurality of first signals and/or the at least one second signal) and/or cyclic redundancy check (CRC) parity protection. In one example, the JUST field 510 can be associated with Generic Mapping Procedure (GMP) data. In an aspect, the JUST field 510 can store timing information associated with the plurality of first signals and/or the at least one signal. In another aspect, the JUST field 510 can store information that is associated with other signals (e.g., signals not associated with the particular JUST field). For example, the JUST field 510 can store information associated with a next signal and/or a previous signal. In yet another aspect, the JUST field 510 can store information associated with the distribution of groups of data. In yet another aspect, the JUST field 510 can store a number of tributary signals generated from the plurality of first signals and/or the at least one second signal.

In an aspect, the JUST field 510 can be partitioned into a plurality of groups for justification control. For example, the JUST field 510 can be portioned into a first group of data associated with justification information and a second group of data associated with the plurality of first signals and/or the at least one second signal. In an example, the first group of data can be partitioned into a plurality of bytes of data (e.g., three bytes of data). The first group of data can include, but is not limited to, an increment indicator field, a decrement indicator field and/or an error check code field. In another example, the second group of data can be partitioned into a plurality of bytes of data (e.g., three bytes of data). In one example, the second group of data can include timing information for the plurality of first signals and/or the at least one second signal.

The payload field 512 can be a payload area. The payload field 512 can include data associated with a container signal (e.g., the payload field 512 can be a data field that includes data from the plurality of first signals and/or the at least one second signal). For example, a container signal from the plurality of first container signals and/or the plurality of second container signals can be included in a payload field 512 of the modified signal 500. The payload field 512 can include one or more payload bytes and/or one or more stuff bytes. The one or more payload bytes can correspond to a data associated with a container signal (e.g., a container signal generated from the plurality of first modified signals and/or the plurality of second modified signals). In an aspect, a location of the one or more stuff bytes with respect to the one or more payload bytes can be determined by a mapping algorithm (e.g., a mapping distribution pattern associated with a GMP). In one example, the mapping algorithm can be a Sigma-Delta ($\Sigma$-$\Delta$) algorithm. A stuff value for each stuff byte can be a predetermined stuff value. For example, a value for each stuff byte (e.g., a predetermined stuff value) can be a particular hexadecimal value (e.g., an "A5" hexadecimal value). In an aspect, a predetermined stuff value can be a pattern that includes a certain number (e.g., a minimum number) of 1/0 (or 0/1) bit transitions. For example, the payload field 512 can be unscrambled (e.g., data included in the payload field can be unscrambled). As such, a predetermined stuff value other than a value of all "0" bits or all "1" bits can be utilized. In one example, the payload field 512 can be 16304 bytes. In an aspect, the payload field 512 can comprise a maintenance signal when the signal is determined to contain a defect. Thus, a maintenance signal can be mapped and/or de-mapped to/from the payload field 512.

In an aspect, the AM field 504, the BIP-8 field 506, the OH field 508 and/or the JUST field 510 can be scrambled. In one example, the AM field 504, the BIP-8 field 506, the OH field 508 and/or the JUST field 510 can be scrambled based on a scrambler associated with a polynomial function (e.g., 1+x+x3+x12+x16). In an aspect, the scrambler can reset (e.g., reset to hexadecimal value "FFFF") a most significant bit of a frame after a last framing byte in the frame.

In view of the example systems and/or devices described herein, example methods that can be implemented in accordance with the disclosed subject matter can be further appreciated with reference to flowcharts in FIGS. 6-9. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 6:
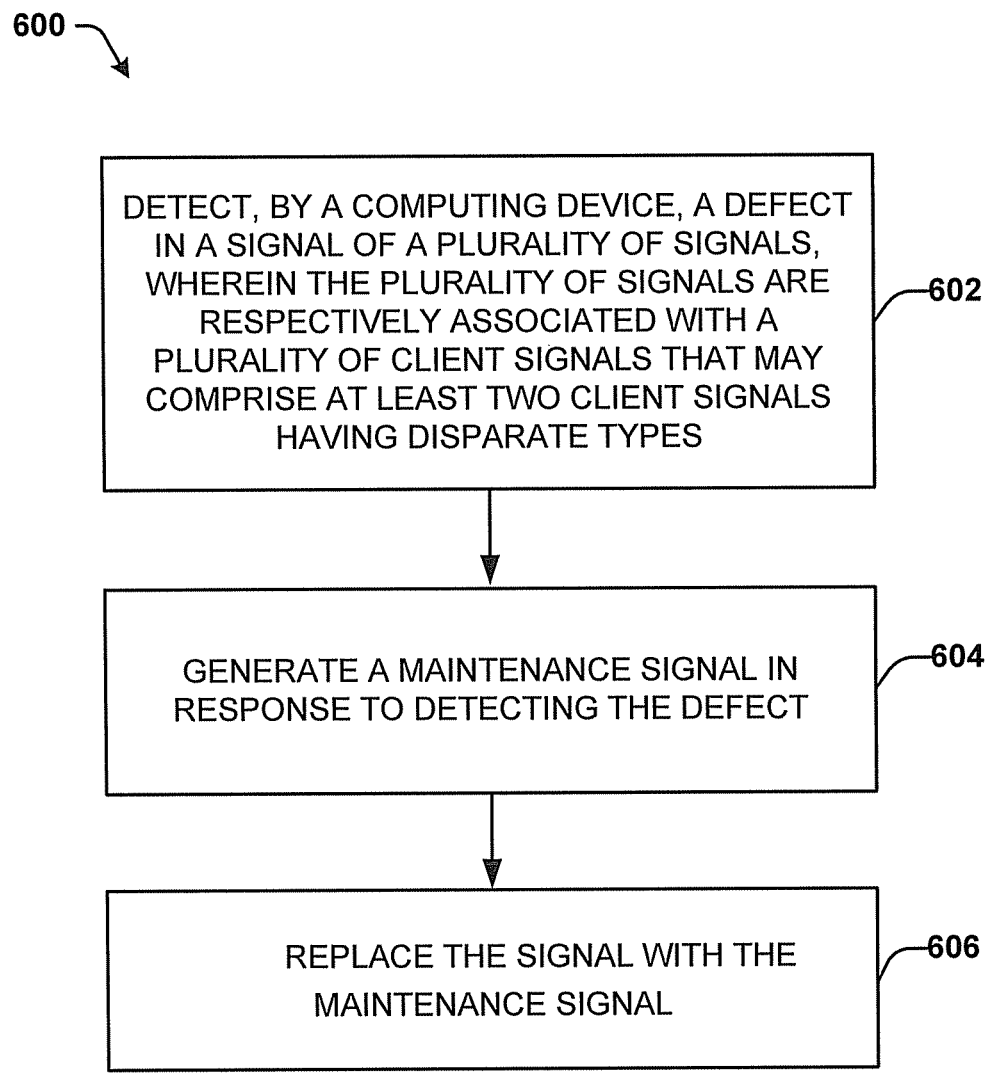
FIG. 6 illustrates a flow diagram of an example, non-limiting embodiment of a method for propagating a defect in a system via a maintenance signal in accordance with various aspects described herein.

FIG. 6 illustrates a flow chart of an example method 600 for reliably propagating a defect in a system, in accordance with aspects described herein.

At 602, a system can detect a defect in a signal of a plurality of signals (e.g., via defect detection component 120). It is noted that the plurality of signals can be comprised in an aggregate signal and/or can be individual signals (e.g., de-aggregated signals, to be aggregate signals, etc.). In an aspect, the plurality of signals can comprise signals of various types (e.g., various data rates associated with the signals). It is noted that the signals can be of a similar and/or identical type.

At 604, a system can generate a maintenance signal in response to detecting the defect (e.g., replacement signal component 310 generating a maintenance signal in response to defect detection component 320 detecting a defect). The maintenance signal can represent a signal generated to replace a defective signal. In embodiments, the maintenance signal can be a signal having identifiable properties. For example, the system can generate the maintenance signal based on a pseudo random noise format (e.g., PN-11).

At 606, a system can replace the defective signal with the maintenance signal (e.g. via replacement signal component 310). For example, the maintenance signal can replace the defective signal before, during, or after aggregating/de-aggregating the plurality of signals. In an aspect, the maintenance signal can be aggregated in replace of the defective signal. In another aspect, the maintenance signal can be propagated through a system in place of the defective signal. It is noted that the maintenance signal can be communicated to a client device, for example, in place of a defective signal. For example, in some embodiments, a maintenance signal can be communicated to a client device rather than a defective signal being communicated to the client device. It is further noted that a client device can be configured for detecting the maintenance signal and associating the maintenance signal with an error.

Figure 7:
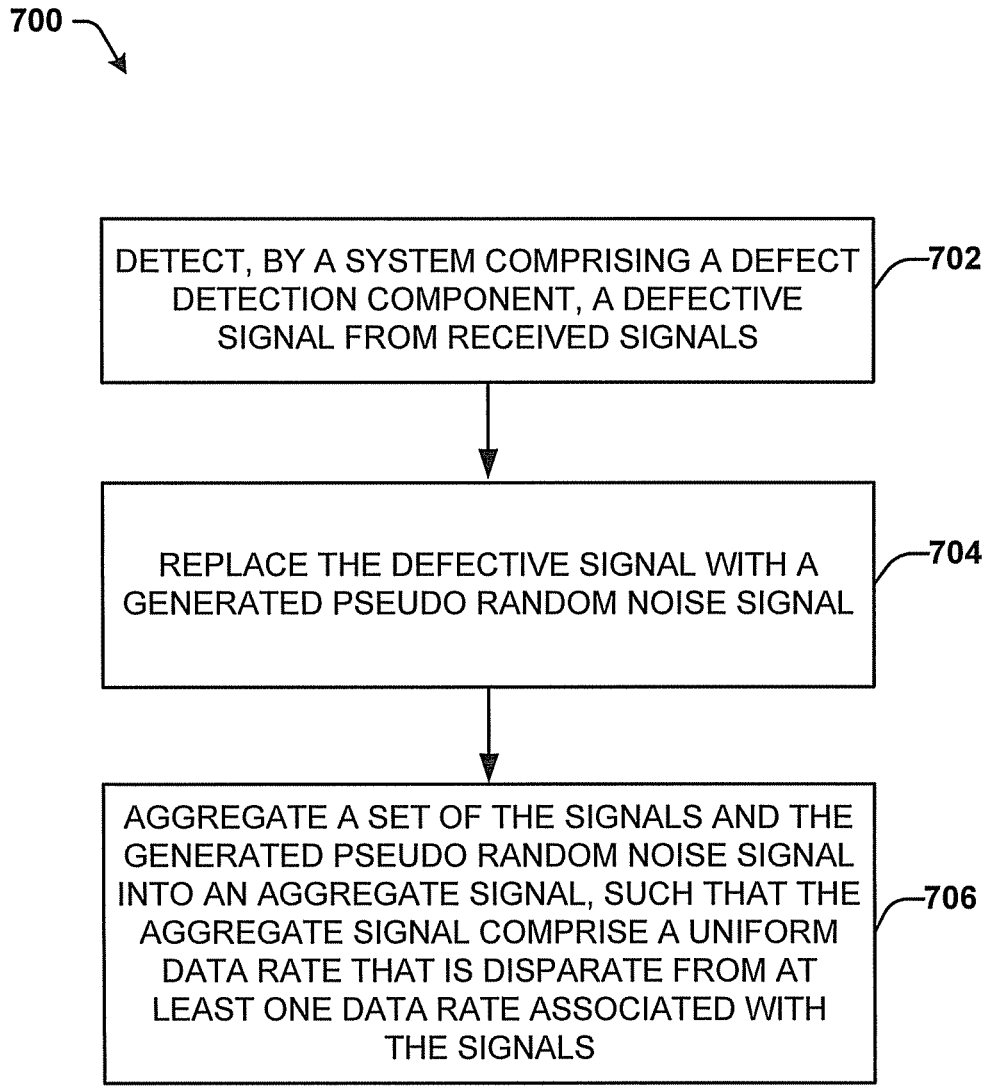
FIG. 7 illustrates a flow diagram of an example, non-limiting embodiment of a method for propagating a defect in a system via a maintenance signal including aggregating signals and the maintenance signal in accordance with various aspects described herein.

FIG. 7 illustrates a flow chart of another example method 700 for propagating a maintenance signal, associated with a defect, through a system, in accordance with aspects described herein. More specifically, method 700 can aggregate signals and a maintenance signal into an aggregate signal. The aggregate signal can be communicated (e.g., transmitted) to various system components (e.g., via defect propagation component 102).

At 702, a system can detect a defective signal from received signals (e.g., via defect detection component 120). In embodiments, a defect can be detected based on implicit information (e.g., clock abnormalities, abnormalities associated with a signal, etc.), explicit data (e.g., a signal notifying of a defect), and/or the like.

At 704, a system can replace the defective signal with a generated pseudo random noise signal (e.g., via replacement signal component 310).

At 706, a system can aggregate a set of the signals and the generated pseudo random noise signal into an aggregate signal, such that the aggregate signal comprise a uniform data rate that is disparate from at least one data rate associated with the signals (e.g. via aggregation component 110). In an aspect, the set of signals can comprise signals associated with client signals (excluding defective signals) and the maintenance signal. It is noted that aggregating can comprise reformatting the signals to synchronize clock times, match data rates, map signals, and the like. In another aspect, signals can be divided into tributary signals, and the tributary signals can be aggregated (and/or replaced by the generated pseudo random noise signal).

Figure 8:
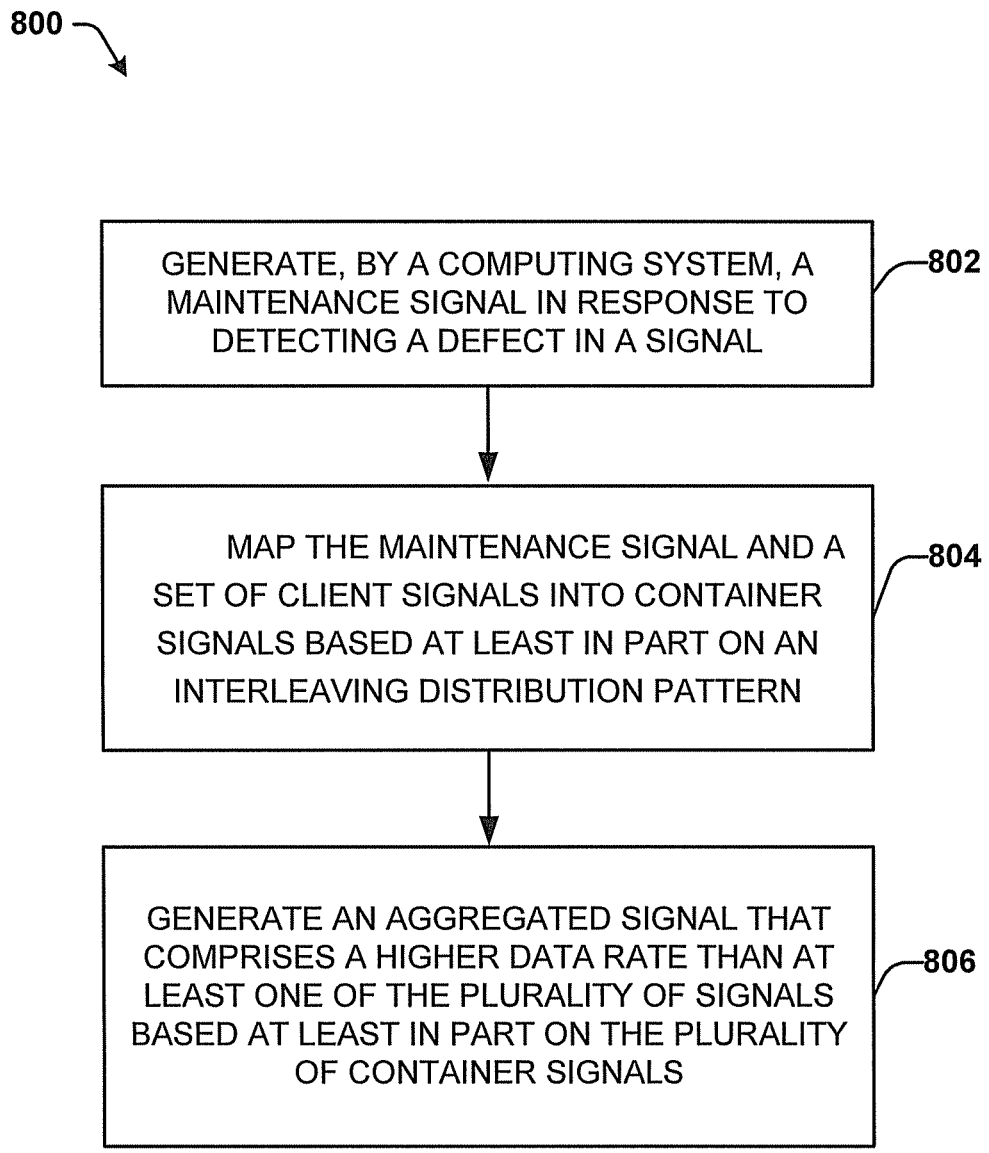
FIG. 8 illustrates a flow diagram of an example, non-limiting embodiment of a method for propagating a defect in a system via a maintenance signal including mapping signals in accordance with various aspects described herein.

FIG. 8 illustrates a flow chart of another example method 800 for propagating a defect in a system including mapping a maintenance signal into a container signal, in accordance with aspects described herein.

At 802, a system can generate a maintenance signal in response to detecting a defect in a signal (e.g., via defect detection component 120). The maintenance signal can be of an identifiable signal type (e.g., PN-11, etc.).

At 804, a system can map the maintenance signal and a set of client signals into container signals based at least in part on an interleaving distribution pattern (e.g., via aggregation component 110). For example, the maintenance signal and the set of client signals can be mapped for aggregation and/or reformatting.

At 806, a system can generate an aggregate signal that comprises a higher data rate than at least one of the plurality of signals based at least in part on the plurality of container signals (e.g., via aggregation component 110). In an aspect, the aggregate signal can correspond to the mapped signals and can comprise the set of client signals and the maintenance signal.

Figure 9:
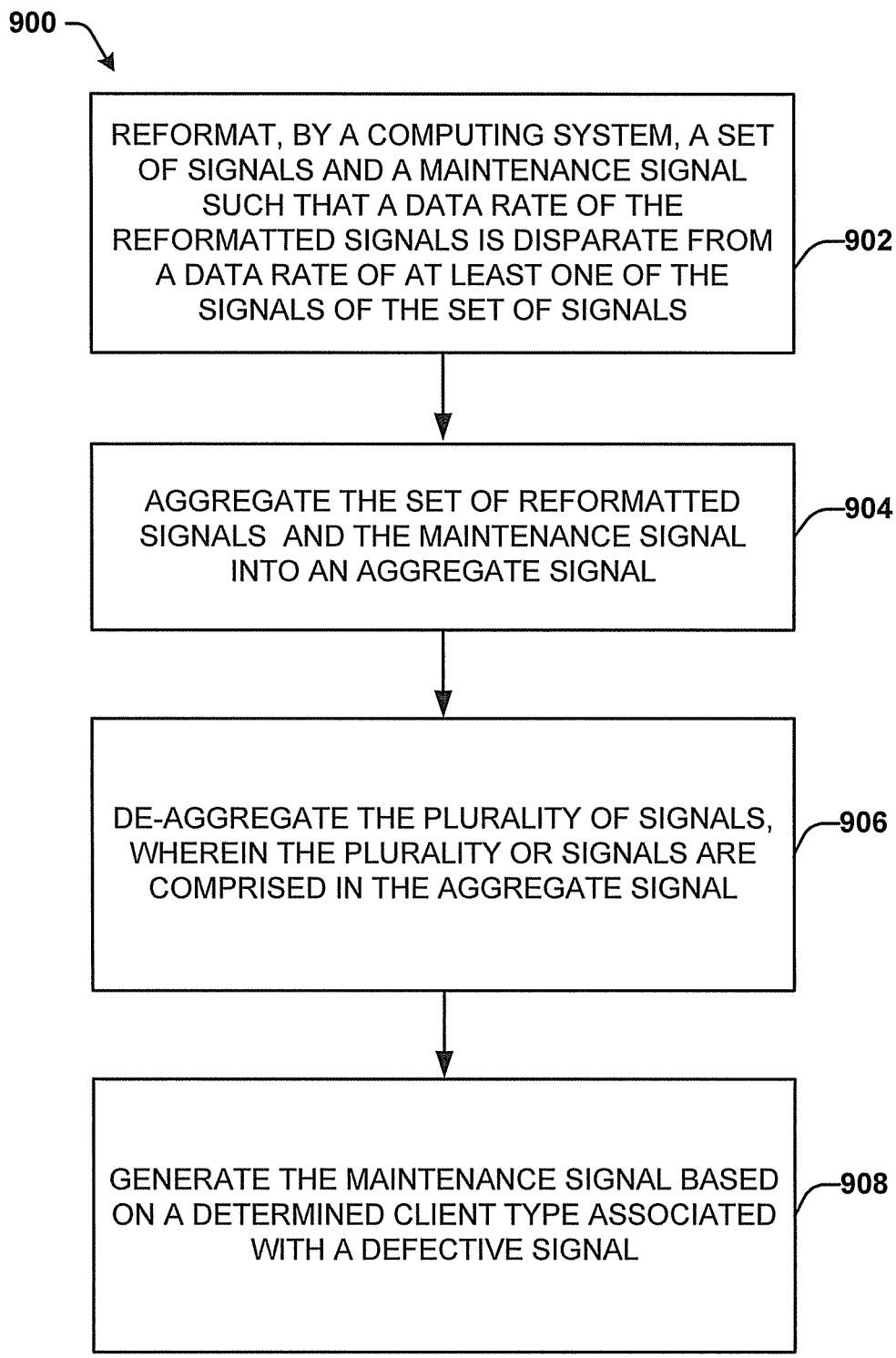
FIG. 9 illustrates a flow diagram of an example, non-limiting embodiment of a method for propagating a defect in a system via a maintenance signal including de-aggregating signals in accordance with various aspects described herein.

FIG. 9 illustrates a flow chart of another example method 900 for propagating a defect in a system including de-aggregating an aggregate signal, in accordance with aspects described herein.

At 902, a system can reformat by set of signals and a maintenance signal such that a data rate of the reformatted signals is disparate from a data rate of at least one of the signals of the set of signals (e.g., via aggregation component 110). For example, client signals can be divided, frequency locked, converted based on data rates, and the like. It is noted that the maintenance signal can be reformatted and/or can be generated such that reformatting is not needed.

At 904, a system can aggregate the set of reformatted signals and the maintenance signal into an aggregate signal (e.g., via aggregation component 110). For example, the aggregate signal can comprise a signal having a uniform data rate, a number of logical signals associated with client signals, and the like.

At 906, a system can de-aggregate the plurality of signals, wherein the plurality or signals are comprised in the aggregate signal (e.g., via de-aggregation component 210). In an aspect, de-aggregating can include de-mapping, de-multiplexing, adjusting data rates, adjusting clocks, combining tributary signals, and the like. In an aspect, de-aggregating can further comprise identifying a maintenance signal and/or determining a defect in one or more of the plurality of signals.

At 908, a system can generate the maintenance signal based on a determined client type associated with a defective signal (e.g., via defect propagation component 220). In embodiments, a client type can be a type associated with a signal, a type associated with a destination device, a type associated with an original signal, and/or the like. It is note that the system can replace a first maintenance signal having one type with a second maintenance signal having a type based on the client type. For example, a de-aggregation component (e.g., de-aggregation component 220) can receive a maintenance signal in the form of a PN-11 signal. The de-aggregation component can generate a new maintenance signal that is specific for a client type associated with the defective signal.

Figure 10:
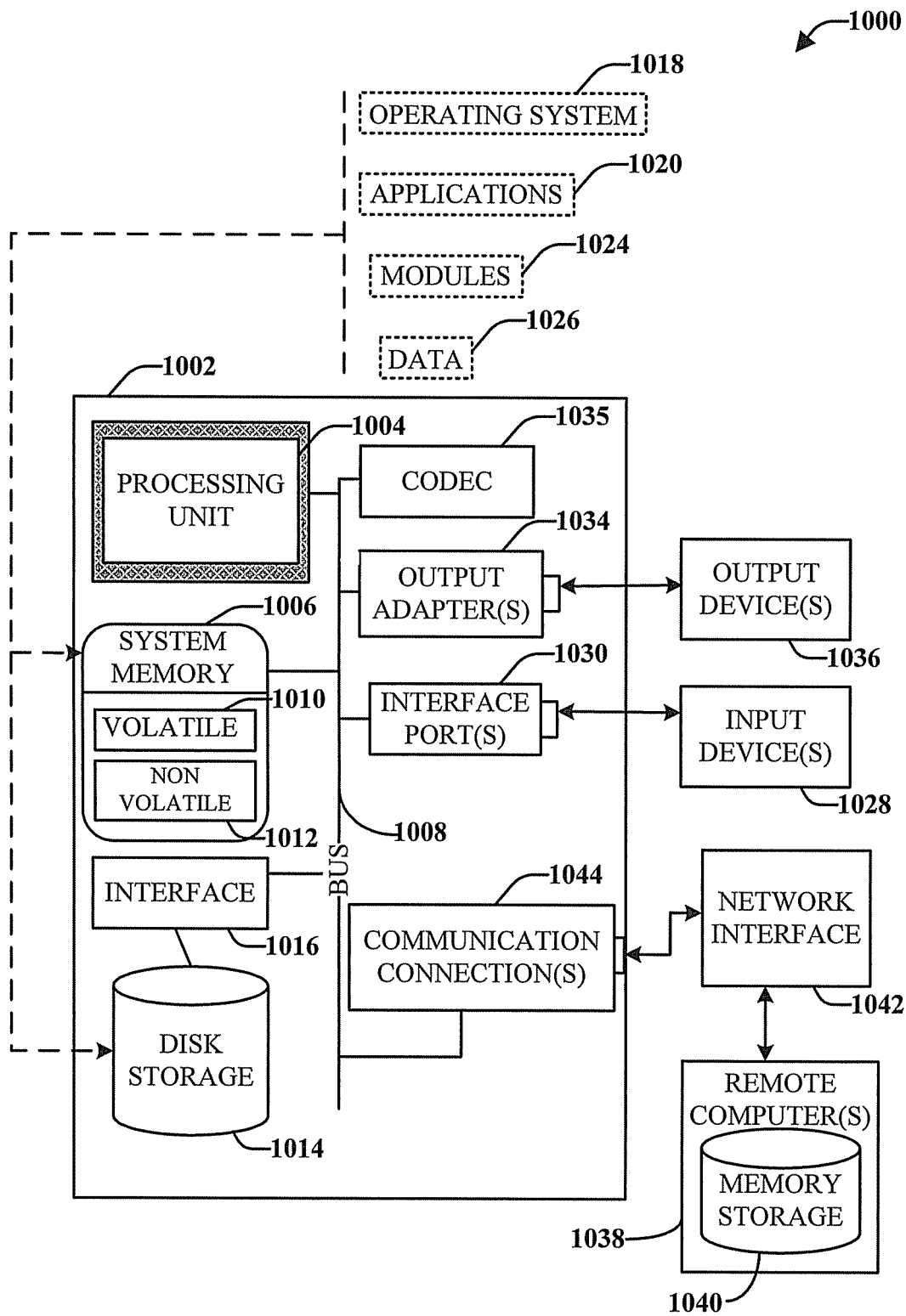
FIG. 10 illustrates a block diagram of an example electronic computing environment that can be implemented in conjunction with one or more aspects described herein.

As mentioned, advantageously, the techniques described herein can be applied to any device and/or network where it is desirable to employ a plurality of signals (e.g., a plurality of signal types and/or a plurality of signal data rates). It is to be understood, therefore, that handheld, portable and other computing devices and computing objects of all kinds are contemplated for use in connection with the various non-limiting embodiments. Accordingly, the below general purpose remote computer described below in FIG. 10 is but one example, and the disclosed subject matter can be implemented with any client having network/bus interoperability and interaction. Thus, the disclosed subject matter can be implemented in an environment of networked hosted services in which very little or minimal client resources are implicated, e.g., a networked environment in which the client device serves merely as an interface to the network/bus, such as an object placed in an appliance.

Although not required, some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules or components, being executed by one or more computer(s), such as projection display devices, viewing devices, or other devices. Those skilled in the art will appreciate that the disclosed subject matter may be practiced with other computer system.

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

With reference to FIG. 10, a suitable environment 1000 for implementing various aspects of the claimed subject matter includes a computer 1002. The computer 1002 includes a processing unit 1004, a system memory 1006, a codec 1005, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 13104), and Small Computer Systems Interface (SCSI).

The system memory 1006 includes volatile memory 1010 and non-volatile memory 1012. The basic input/output system (BIOS), containing the basic routines to transfer information between elements within the computer 1002, such as during start-up, is stored in non-volatile memory 1012. In addition, according to present innovations, codec 1005 may include at least one of an encoder or decoder, wherein the at least one of an encoder or decoder may consist of hardware, a combination of hardware and software, or software. Although, codec 1005 is depicted as a separate component, codec 1005 may be contained within non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), or flash memory. Volatile memory 1010 includes random access memory (RAM), which acts as external cache memory. According to present aspects, the volatile memory may store the write operation retry logic (not shown in FIG. 10) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM).

Computer 1002 may also include removable/non-removable, volatile/non-volatile computer storage medium. FIG. 10 illustrates, for example, disk storage 1014. Disk storage 1014 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016.

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s). Thus, for example, a USB port may be used to provide input to computer 1002, and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices and/or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

Figure 11:
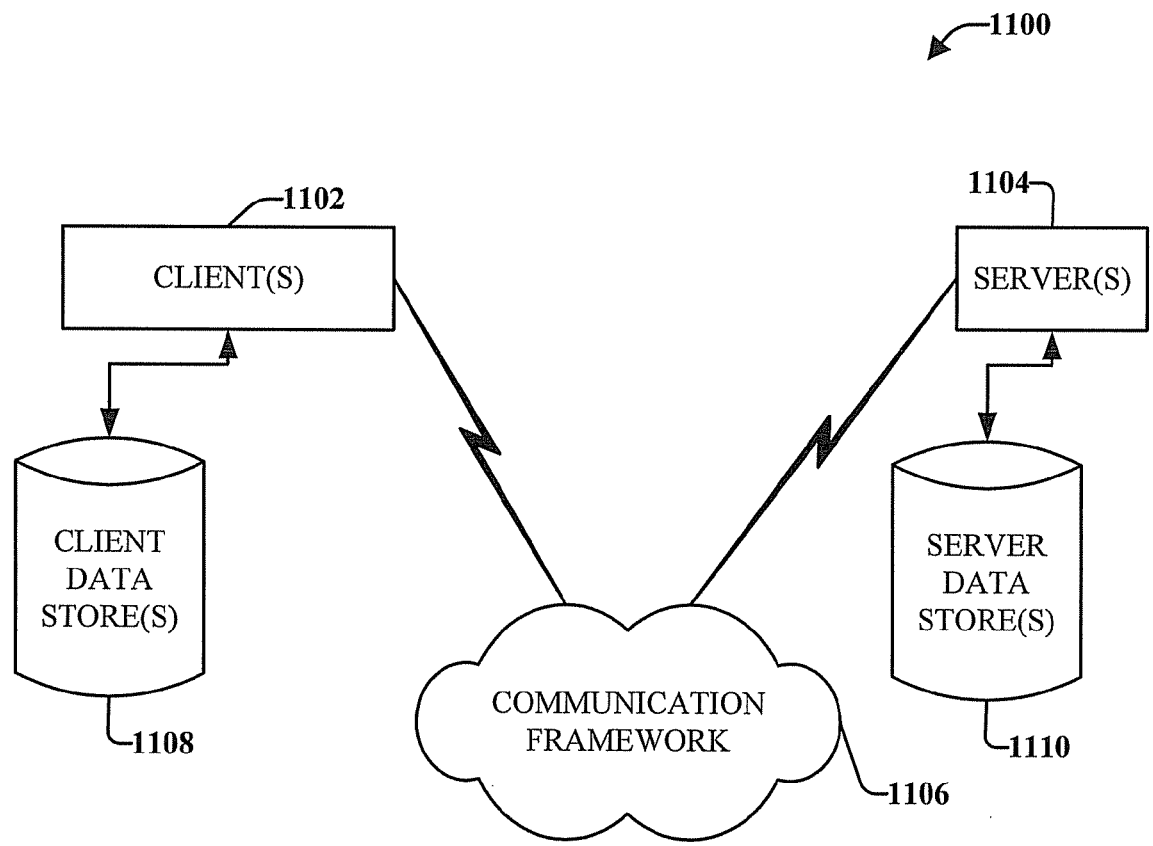
FIG. 11 illustrates a block diagram of an example data communication network that can be operable in conjunction with various aspects described herein.

Referring now to FIG. 11, there is illustrated a schematic block diagram of a computing environment 1100 in accordance with this disclosure. The system 1100 includes one or more client(s) 1102 (e.g., laptops, smart phones, PDAs, media players, computers, portable electronic devices, tablets, and the like). The client(s) 1102 can be hardware and/or software (e.g., threads, processes, computing devices). The system 1100 also includes one or more server(s) 1104. The server(s) 1104 can also be hardware or hardware in combination with software (e.g., threads, processes, computing devices). The servers 1104 can house threads to perform transformations by employing aspects of this disclosure, for example. One possible communication between a client 1102 and a server 1104 can be in the form of a data packet transmitted between two or more computer processes wherein the data packet may include video data. The data packet can include a metadata, e.g., associated contextual information, for example. The system 1100 includes a communication framework 1106 (e.g., a global communication network such as the Internet, or mobile network(s)) that can be employed to facilitate communications between the client(s) 1102 and the server(s) 1104.

Communications can be facilitated via a wired (including optical fiber) and/or wireless technology. The client(s) 1102 include or are operatively connected to one or more client data store(s) 1108 that can be employed to store information local to the client(s) 1102 (e.g., associated contextual information). Similarly, the server(s) 1104 are operatively included or are operatively connected to one or more server data store(s) 1110 that can be employed to store information local to the servers 1104.

In one embodiment, a client 1102 can transfer an encoded file, in accordance with the disclosed subject matter, to server 1104. Server 1104 can store the file, decode the file, or transmit the file to another client 1102. It is to be appreciated, that a client 1102 can also transfer uncompressed file to a server 1104 and server 1104 can compress the file in accordance with the disclosed subject matter. Likewise, server 1104 can encode video information and transmit the information via communication framework 1106 to one or more clients 1102.

Reference throughout this specification to "one embodiment," "an embodiment," "an example", "a disclosed aspect," or "an aspect" means that a particular feature, structure, or characteristic described in connection with the embodiment or aspect is included in at least one embodiment or aspect of the present disclosure. Thus, the appearances of the phrase "in one embodiment," "in one example," "in one aspect," or "in an embodiment," in various places throughout this specification are not necessarily all referring to the same embodiment. Furthermore, the particular features, structures, or characteristics may be combined in any suitable manner in various disclosed embodiments.

As utilized herein, terms "component," "system," "architecture," "engine" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, calculating, determining, or displaying, and the like, refer to the action and processes of processing systems, and/or similar consumer or industrial electronic devices or machines, that manipulate or transform data represented as physical (electrical and/or electronic) quantities within the registers or memories of the electronic device(s), into other data similarly represented as physical quantities within the machine and/or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

What is claimed is:

1. A system, comprising:
   a memory storing computer executable components; and
   a processor configured to execute the following computer executable components stored in the memory:
   a defect detection component configured for detecting a defect associated with a first signal;
   a replacement signal component configured for:
   determining a frequency associated with the first signal;
   generating a maintenance signal based on the frequency associated with the first signal in response to the defect detection component detecting the defect in the first signal; and replacing the first signal with the maintenance signal; and an aggregation component configured for aggregating the maintenance signal and a second signal into an aggregate signal for transmission at another frequency that is different than the frequency associated with the first signal.

2. The system of claim 1, wherein the first signal is comprised in a plurality of signals associated with a plurality of client signals.

3. The system of claim 2, wherein the replacement signal component is further configured for replacing the first signal without altering disparate signals of the plurality of signals.

4. The system of claim 1, wherein the aggregation component is further configured for formatting the aggregate signal in a signal format that is different than another signal format associated with the first signal.

5. The system of claim 1, wherein the aggregation component is further configured for reformatting the second signal and the maintenance signal such that a data rate of the aggregate signal is disparate from a data rate of the second signal.

6. The system of claim 1, wherein the replacement signal component is further configured for generating the maintenance signal with a pseudo-random sequence.

7. The system of claim 1, wherein the replacement signal component is further configured for generating a pseudo random noise 11 (PN-11) signal as the maintenance signal.

8. The system of claim 7, wherein the replacement signal component is further configured for generating the PN-11 signal within a frequency range based on a frequency range of the first signal.

9. The system of claim 1, further comprising a de-aggregation component configured for de-aggregating the first signals from the aggregate signal.

10. The system of claim 9, wherein the defect detection component is further configured for detecting the defect during the de-aggregation, and wherein the replacement signal component is configured for replacing the first signal with the maintenance signal during the de-aggregation.

11. The system of claim 1, wherein replacement signal component is further configured for generating the maintenance signal based on a client device associated with the first signal.

12. The system of claim 1, wherein the defect detection component is further configured for, in response to determining the first signal is a tributary signal, replacing a second signal tributary associated with the first signal, with the maintenance signal.

13. The system of claim 1, wherein the defect detection component is configured for detecting a clock abnormality associated with the first signal.

14. A method for propagating signal defects, comprising:
  detecting, by a system comprising at least one processor, a defect in a first signal;
  determining, by the system, a frequency associated with the first signal;
  generating, by the system, a maintenance signal based on the frequency associated with the first signal in response to detecting the defect;
  replacing, by the system, the first signal with the maintenance signal; and
  generating an aggregate signal for transmission at another frequency that is different than the frequency associated with the first signal by aggregating the maintenance signal and a second signal.

15. The method of claim 14, further comprising generating the maintenance signal based on a pseudo-random sequence.

16. The method of claim 14, wherein replacing the first signal with the maintenance signal further comprises generating a pseudo noise 11 (PN-11) type signal.

17. The method of claim 14, wherein replacing the signal further comprises:
  mapping the maintenance signal and a set of the plurality of client signals into container signals based at least in part on an interleaving distribution pattern.

18. The method of claim 14, further comprising:
  de-aggregating, by the system, a plurality of signals, wherein the plurality of signals are comprised in the aggregate signal.

19. The method of claim 14, wherein the generating further comprises generating the maintenance signal as a function of a client signal associated with the maintenance signal.

20. A non-transitory computer readable storage medium comprising computer-executable instruction that, in response to execution, cause a system including at least one processor to perform operations, comprising:
  receiving signals associated with client signals;
  detecting a defective signal of the received signals;
  determining a data rate associated with the defective signal;
  generating a pseudo random noise signal based on the data rate associated with the defective signal;
  replacing the defective signal with the generated pseudo random noise signal; and
  aggregating a first set of the signals and the generated pseudo random noise signal into an aggregate signal, such that the aggregate signal comprises a uniform data rate that is disparate from the data rate associated with the defective signal.

21. The non-transitory computer storage medium of claim 20, the operations further comprising:
  de-aggregating the aggregate signal into a second set of signals associated with the client signals.

22. The non-transitory computer storage medium of claim 21, the operations further comprising:
  replacing, in response to the de-aggregating, a signal of the second set of signals with a client specific maintenance signal that is generated according to a client type associated with the signal.

23. The non-transitory computer storage medium of claim 20, the operations further comprising:
  detecting the defective signal comprised in the aggregate signal.

24. The non-transitory computer storage medium of claim 23, the operations further comprising:
  mapping the generated pseudo random noise signal into the aggregate signal.

* * * * *